United States Patent
Adams

[11] 3,901,192
[45] Aug. 26, 1975

[54] BIRD FEEDER
[76] Inventor: John F. Adams, 55 Lee Rd., Chestnut Hill, Mass. 02167
[22] Filed: Apr. 9, 1974
[21] Appl. No.: 459,347

[52] U.S. Cl.................................. 119/51 R; 119/61
[51] Int. Cl.............................................. A01b 5/00
[58] Field of Search................. 119/51 R, 61, 63, 18

[56] References Cited
UNITED STATES PATENTS
1,531,842  3/1925  Carpenter.......................... 119/51 R
FOREIGN PATENTS OR APPLICATIONS
915,480  1/1963  United Kingdom................ 119/51 R

*Primary Examiner*—Louis G. Mancene
*Assistant Examiner*—J. N. Eskovitz
*Attorney, Agent, or Firm*—Thompson, Birch, Gauthier & Samuels

[57] ABSTRACT

A bird feeder having a cup-like container for the bird seed, a vertical central shaft to support the container, a bent rod attached to the vertical shaft for hanging the bird feeder from a window frame (or other support), and a lid attached to the bent rod and spaced slightly above the container to protect the seed from the weather and to keep out large birds. The bird feeder's central shaft carries a horizontal plate, such as a washer, to support the seed container and to prevent tipping. Also, a locking member is fitted to both the central shaft and the bent rod to prevent the bird feeder from swinging or otherwise moving despite the weight or activities of the birds.

9 Claims, 2 Drawing Figures

PATENTED AUG 26 1975  3,901,192

BIRD FEEDER

BACKGROUND OF THE INVENTION

There are a wide variety of bird feeders presently on the market. However, almost all of them are relatively expensive, quite large and complicated. Also, they usually require considerable assembly time, skill and tools. Finally, they usually require a large supporting post or they are hung by a cord from a tree limb, thus permitting the bird feeder to swing undesirably.

SUMMARY OF THE INVENTION

The primary object of this invention is to provide an extremely inexpensive bird feeder which has as its basic parts the cup-like container and lid of a conventional plastic margarine container. The other parts are also extremely simple to fabricate and cost very little. Thus, the completed bird feeder can be sold very cheaply or even given away with seed purchases, much as razors are virtually given away with blade purchases.

DESCRIPTION OF THE PREFERRED EMBODIMENT

Figure 1:
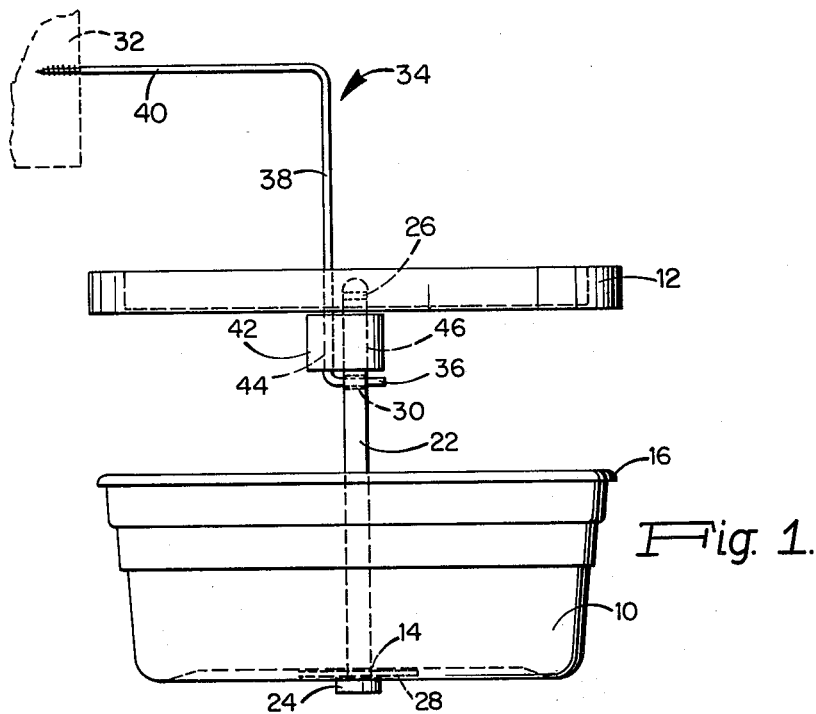
FIG. 1 is an elevation of the bird feeder showing its mounting to a vertical bulkhead.
Figure 2:
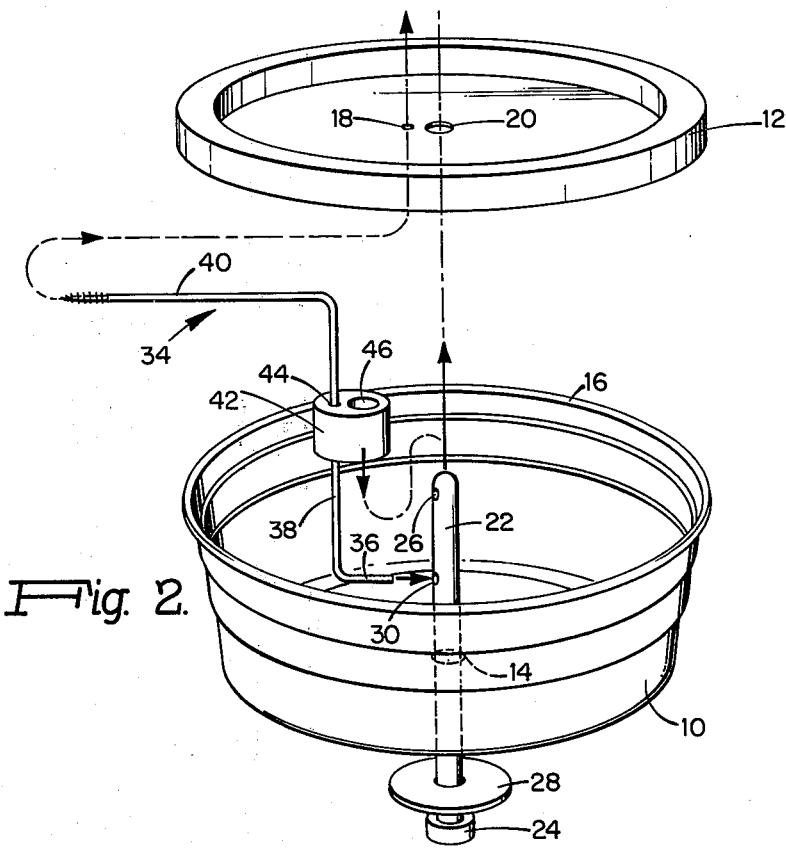
FIG. 2 is an exploded perspective view of the bird feeder of FIG. 1, showing the flow of its assembly sequence.

The two primary parts of the bird feeder of this invention are the cup-like hollow seed container 10 and the matching lid 12. In the preferred embodiment, these are conventional margarine plastic container parts and can be purchased very cheaply from container manufacturers.

Seed container 10 is provided with a centered bottom hole 14 and has an open top rim 16. Lid 12 is provided with a first hole 18 and a second hole 20. In the preferred embodiment, first hole 18 is slightly offset from the center of the lid, whereas second hole 20 is centered. In an alternate version of the invention, second hole 20 is omitted, and first hole 18 is located either in the center of the lid 12 or is slightly offset from the center.

A vertical central shaft 22, preferably made of plastic, is inserted upwardly through container bottom hole 14. The central shaft 22 has a head 24 at its lower end (larger in diameter than hole 14) and optionally has a string hole 26 at its upper end. Central shaft 22 carries a conventional washer 28 between its head 24 and the flat bottom of seed container 10. Thus, when the shaft 22 is held vertically, the seed container 10 cannot slide downwardly and cannot easily tip because of the support which the washer provides against a substantial area of the seed container bottom. The shaft 22 is also provided with a horizontal hole 30 spaced slightly below the upper end of the shaft, but spaced considerably above the lower end of the shaft. As seen in FIG. 1, hole 30 is located above the container top rim 16, when viewed in elevation.

In order to mount the seed container to a vertical surface, such as a window frame 32 (shown in dotted in FIG. 1), a rod-like mounting element 34 is provided. Preferably, mounting element 34 is 0.092-inch diameter wire which is bent to form a horizontal lower free end 36, a vertical middle portion 38, and a horizontal upper free end 40. Upper free end 40 is provided with screw threads and points in the opposite direction from lower free end 36. The upper free end is designed to be screwed into a vertical wooden surface and to be fixed in the position shown in FIG. 1. However, before being screwed into the vertical surface, lid 12 should be inserted onto upper free end 40 through lid hole 18 and slid downwardly until the lid reaches middle portion 38 of the mounting element 34.

The final element of this invention is locking member 42, the purpose of which is to completely lock the central shaft 22 and the mounting element 34 together, and also to prevent the lid 12 from revolving or tipping. Locking member 42 is preferably a wooden or plastic solid cylinder which has two parallel vertical holes 44 and 46 bored therethrough. Locking member 42 is inserted onto the mounting element 34 through smaller hole 44 preferably before the mounting element is bent during manufacture. Thus, locking member 42 is free to slide along middle portion 38, but cannot accidentally slide off either free end 36 or 40.

After lid 12 has been inserted onto upper free end 40 of mounting element 34, and the mounting element 34 (carrying locking member 42) has been screwed into the vertical wooden surface 32, then the mounting element lower free end 36 is inserted through horizontal shaft hole 30 in the vertical central shaft 22. The locking member 42 is raised on middle portion 38 and larger hole 46 of the locking member is lowered over the upper end of central shaft 22.

Finally, hole 20 in lid 12 is lowered over the upper end of central shaft 22 so that the lower horizontal surface of lid 12 rests upon the upper horizontal surface of locking member 42, as shown in FIG. 1. In this arrangement, because of the locking member, the central shaft 22 and seed container 10 cannot swing about the mounting element 34 and cannot pull away from it. Furthermore, the lid 12 cannot revolve because of the two vertical elements passing through it. Also, tipping of both the lid 12 and the seed container 10 is virtually eliminated because of the substantial horizontal support members upon which they rest.

An alternate embodiment eliminates the second lid hole 20 and does not bore locking element larger hole 46 entirely through to the upper surface of locking member 42. Thus, the locking function remains, but the lid is free to rotate about middle portion 38.

In accordance with the foregoing description, it will be appreciated that the bird feeder can be packaged with both bird seed and the various components carried within the seed container 10 which is closed by lid 12. Then, the purchaser can assemble the unit and install it. After the bird seed has been eaten, it can be easily replenished.

It will also be understood that all of the components shown in the drawings, except the seed container and lid, can be sold as a package, with the purchaser being instructed to utilize a conventional empty margarine container and lid.

In conclusion, this invention provides a very inexpensive and simple bird feeder which can be sold as a complete package (with or without bird seed), which can be sold without the seed container and lid, or which can be given away without bird seed as an encouragement for subsequent and continuing bird seed purchases.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. A bird feeder comprising:
   a. a cup-like hollow seed container having an open top and a substantially centered bottom hole;
   b. a vertical central shaft inserted upwardly through the bottom hole in said seed container, said central shaft having support means associated therewith for cooperating with the bottom of said seed container to resist downward axial movement and axial tipping of said seed container relative to said central shaft;
   c. said central shaft having a substantially horizontal hole formed transversely therethrough, the hole being located above the lower end of said shaft;
   d. a bent rod-like mounting element having a substantially horizontal free end inserted through said horizontal shaft hole, said rod-like mounting element further having a substantially vertical middle portion positioned substantially parallel to said central shaft, said rod-like mounting element further having means associated with its other end for engaging a fixed support from which the bird feeder is suspendably mounted;
   e. locking means for retaining said rod-like mounting element free end in said shaft hole and for retaining said rod-like mounting element middle portion in substantially parallel alignment with said central shaft; and
   f. a lid having a vertical hole through which said other end of said rod-like mounting element is inserted, said lid being positioned in a substantially horizontal attitude and being spaced above said top of said seed container.

2. The bird feeder of claim 1 wherein said seed container bottom support means includes an enlarged portion formed on the lower end of said shaft and a washer carried by said shaft between said enlarged portion and the bottom of said seed container.

3. The bird feeder of claim 1 wherein said lid has approximately the same diameter as said seed container.

4. The bird feeder of claim 1 wherein said bent rod-like mounting element has a horizontal lower free end portion, a vertical middle portion, and a horizontal upper free end portion, said lower and upper portions being joined to said middle portion and extending in opposite directions with respect thereto.

5. The bird feeder of claim 1 wherein said locking means has a body through which two substantially vertical parallel holes are formed, said central shaft being inserted through one of said holes and said mounting element being inserted through the other of said holes.

6. The bird feeder of claim 5 wherein said lid is supported in its position by the upper surface of said locking means body.

7. The bird feeder of claim 6 wherein said lid has a second vertical hole through which said other end of said vertical central shaft is inserted upwardly, said lid being thereby fixed against rotation about said mounting element or said central shaft.

8. The bird feeder of claim 7 wherein said second vertical hole is located in the axial center of said lid.

9. The bird feeder of claim 8 wherein said locking means body has the form of a solid cylinder with the two holes having axes which are parallel to the axis of said solid cylinder.

* * * * *